INVENTORS
ALFRED HEICHEL
PETER FLORJANCIC

July 4, 1967

A. HEICHEL ETAL 3,328,848

CHAIN MOLDING DEVICE

Filed May 29, 1963

INVENTORS
ALFRED HEICHEL
PETER FLORJANCIC

BY

*Mc Glew & Toren*

ATTORNEYS.

July 4, 1967

A. HEICHEL ET AL 3,328,848

CHAIN MOLDING DEVICE

Filed May 29, 1963

INVENTORS
ALFRED HEICHEL
PETER FLORJANCIC

BY McGlew & Toren

ATTORNEYS.

United States Patent Office 3,328,848
Patented July 4, 1967

3,328,848
CHAIN MOLDING DEVICE
Alfred Heichel, Schutzenhaus, Babenhausen, Germany, and Peter Florjancic, Hauptplatz 20, Zillach, Karten, Austria
Filed May 29, 1963, Ser. No. 358,969
Claims priority, application Germany, June 2, 1962, R 32,850
(Filed under Rule 47(a) and 35 U.S.C. 116)
7 Claims. (Cl. 18—42)

This invention relates in general to chain manufacturing devices and, in particular, to a new and useful apparatus continuously molding interengaged chain links.

The invention pertains particularly to an apparatus for the production of chains or chain-like structures of any suitable length wherein the chains consist of individual endless links of equal configuration and size. The chains are advantageously made from materials which can be injection-molded or die cast and the procedure is carried out in a continuous manner.

The materials from which the chains can be made include all of those materials which can be molded or cast by injection or die casting, that is metals, metal alloys, plastics, ceramics masses and synthetic materials such as plastics. The individual chain links can also be injected with reinforcing inserts which increase the stability of the chain. The invention is applicable to all fields which make use of chains.

Prior to the present invention some suggestion has been made to cast or injection-mold a chain link of a predetermined number of links in a four-jaw mold. In this mold the link-forming mold cavities which are linked to each other, or interlaced, are alternatingly worked into those partition planes of the mold which extend perpendicular to each other and which intersect in the chain axis. Such a prior art mold has an open cutout or recess at one of its ends. This recess or cutout is in the form of a negative of one half of a link. The individual chain links are assembled or connected together by means of this half link negative. The even and the odd links are connected to each other through the fins or slugs which are formed at the individual links during the molding. These fins are situated at the legs of the links, and after the length of the chain has been taken out of the mold, the fins have to be removed.

Prior art modes of this type are suitable for forming chains of any desired length. This is done in a manner such that the form is made shorter and the individual links are individually cast or molded. For the purpose of interconnecting the individual links, it is then required that the last molded link be placed in the open end of the mold, and additional links are molded one at a time until the desired chain length has been obtained. Such a procedure, however, is a manual piece-by-piece procedure and is very time consuming.

In accordance with the present invention there is provided both a machine for manufacturing chain links which may be carried out or operated continuously. In accordance with the invention there is provided an apparatus which includes a mold form of four radially movable jaw elements, each of which has a negative configuration conforming to or duplicating at the lower end the upper portion of a finished link, and forming at the upper end a mold for a complete link which is to be manufactured. Using a mold of this nature, the first link is advantageously molded in the upper portion of the mold and then it is positioned in the lower portion after being turned 90° from its position in the upper portion. Thereafter the chain is continuously pulled down, one link at a time, after each new link is molded in the upper portion around a previously finished link held in the lower portion. The apparatus advantageously includes a clamping mold made of four jaw elements which are moved together for the purposes of forming a new link and which are oriented 90° away from the previously formed link every time the previously formed link is moved downwardly to the lower portion of the mold. In this manner the newly formed link is always positioned at the lowermost portion of the mold at right angles to the mold for forming the next new link.

In a preferred apparatus the mold is preferably divided into four mold elements or jaws with the divisions being effected parallel to the longitudinal axis of the chain length. In this manner two partition planes are formed which extend perpendicular to each other. These partition planes intersect each other in the imaginary longitudinal axis. In each partition plane there is worked into the jaws of the mold a cavity which is complementary, that is negative of the shape of the chain to be injection molded. A cavity corresponding to about half the length of the chain defined in the lower portion is constructed to loop around the cavity defined for the full chain link to be molded in the upper portion of the mold. The cavities are offset relative to each other about 90° to permit the chain links to be looped together in interengagement.

An injection cavity is formed at the upper end which is flared outwardly and upwardly for receiving the lower end of the injection nozzle. The lower cavity is provided merely for accommodating the chain link which has been formed by the previous molding operation. The lower portion thereof is opened to permit the chain to be held by a clamping member which is located directly below the mold jaws.

The chain is fed as the links are formed downwardly preferably by a pair of sprocket wheels which engage with the chain. The advance speed is adjusted in conformity with the repetitive pattern of the mold and of the material employed in forming the chain links. The advance is intermittently timed in conformity with the molding operation. The sprockets which drive the chain after each molding operation may be timed to run with the operation of the injection molding nozzle.

A clamping guide is advantageously employed between the mold and the drawing off sprocket elements which clamping guide may include jaws which may be moved outwardly against a resilient biasing force. The jaws provide means for holding the chain links in their right angle relationships. Such means may comprise merely four-jaw elements of segmental configuration, the jaw elements being spaced apart when engaging the chain links and being resiliently held in engagement with the side faces of each of the chain links. The sprocket elements are arranged to advance the chain one chain link during each molding operation.

In accordance with a further aspect of the invention, the injection cylinder for operating with the means for molding the chains preferably includes a body member which is carried on a cross head and contains a lower injection nozzle, all of which may be reciprocated with the cross head. An injection nozzle and nozzle pin seal the lower end of the body and the pin is moved away from an opening in the nozzle when the cross head with the body moves downwardly into the postion for injection into the mold. The nozzle is closed upon upward return movement after the chain link has been molded. Due to the movable mouth construction of the injector relative movement between the table and the injection cylinder for opening the mold is no longer necessary.

Accordingly, it is an object of this invention to provide an improved device for forming a continuous chain.

A further object of the invention is to provide a device for forming a continuous chain which includes a mold formed by a plurality of jaw elements which may be brought together to form, at the lower portion, a chain positioning cavity for a chain link, and, at the upper portion, a cavity for molding a chain link, the link being disposed with its axis at right angles to the cavity for the formed chain link and in a position to cause a newly formed link to engage around the previously formed link, and with means being provided for injecting material for molding the chain link into the upper portion.

A further object of the invention is to provide a means for automatically making a continuous chain link which includes a clamping element for the chains including means for engaging the last link so that it projects upwardly and is held in a particular orientation, with a mold element engageable around said clamped link and extending thereabove, including a cavity defined around the formed link for molding a new link and including means for drawing off the chain one link at a time after each link is molded.

A further object of the invention is to provide an apparatus for forming chain links which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

Figure 1:
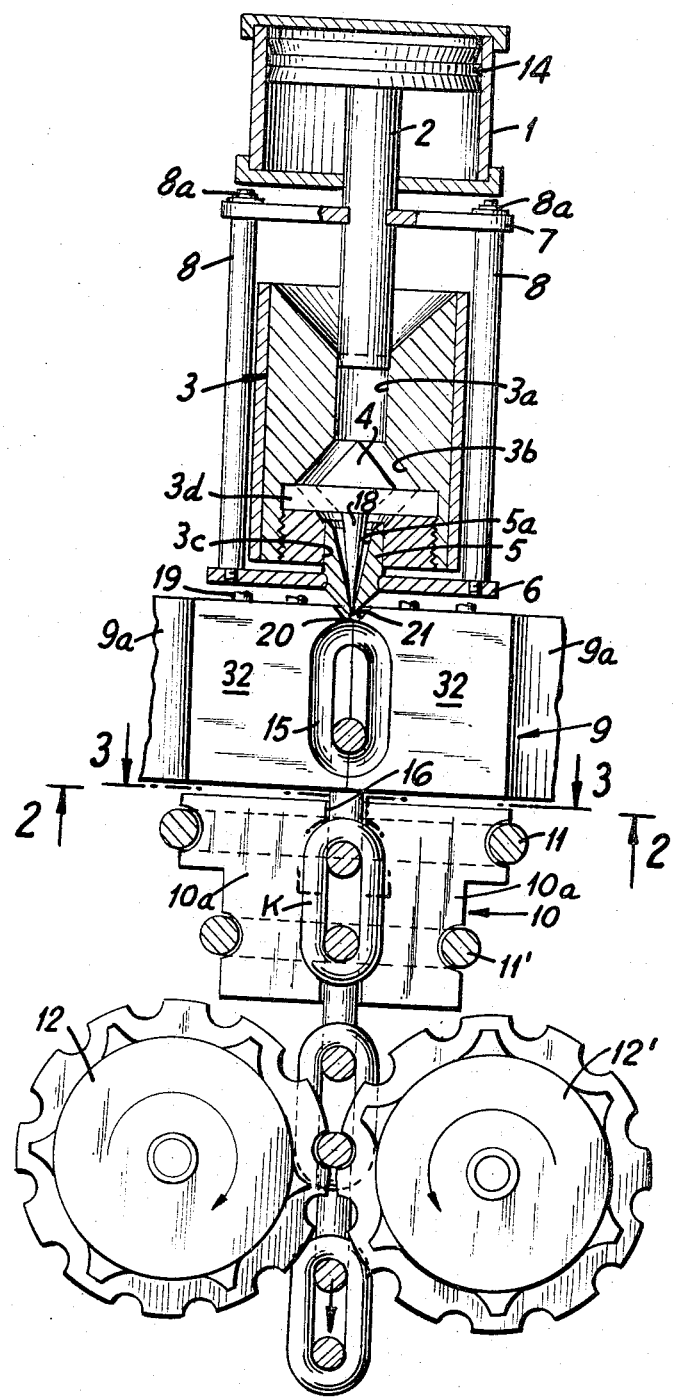
FIG. 1 is a transverse section of a device for the molding of a continuous chain link constructed in accordance with the invention.

Referring to the drawings in particular, the invention embodied therein includes a chain injection molding machine which operates continuously and includes a piston 14 slidable therein which has a piston rod forming an injection ram or plunger 2 which extends outwardly from the lower end thereof. The plunger 2 is slidable in an injection cylinder 3 which has means therein (not shown) for heating it. The injection cylinder includes a cylindrical bore portion 3a in which the end of the plunger 2 is slidable and a widened bore portion 3d which is closed at the lower end by an injection nozzle member 5. A torpedo or nozzle valve member 4 is positioned in the widened space 3b and it includes a needle end or valve element 18 which rides in a conical bore 5a of the nozzle 5. The nozzle 5 is slidable in a lower small diameter cylindrical bore portion 3c of the injection cylinder, and the stroke of its movement may be controlled by the injection plunger 2 to which the nozzle 5 is connected by means of a cross member 6, upstanding side posts or guide rods 8, and a cross member 7. The two guide rods 8, 8 are rigidly mounted on the member 6 but glide in the member 7, and the member 7 is rigidly affixed to the injection piston 2. The guide rods 8 carry at their ends which extend above the member 7 abutments 8a with which the displacement stroke of the nozzle 8 can be adjusted corresponding to the quantity of the material to be injected.

Upon downward movement of the injection piston 2 the nozzle 5 is moved downwardly due to pressure which is transferred to the injection material or mass which is then situated within the injection cylinder 3 ahead of the torpedo 4. The nozzle 5 is drawn away from an injection position in an upward direction in the embodiment illustrated by the rising of the injection piston 2 after the member 7 comes into contact with abutments 8a. In doing so, the needle 18 closes the bore 5a and stops further flow of material. The construction is such that, besides lifting the nozzle 5 away from the mold, there is also an automatic cutoff and termination of the delivery material.

Figure 2:
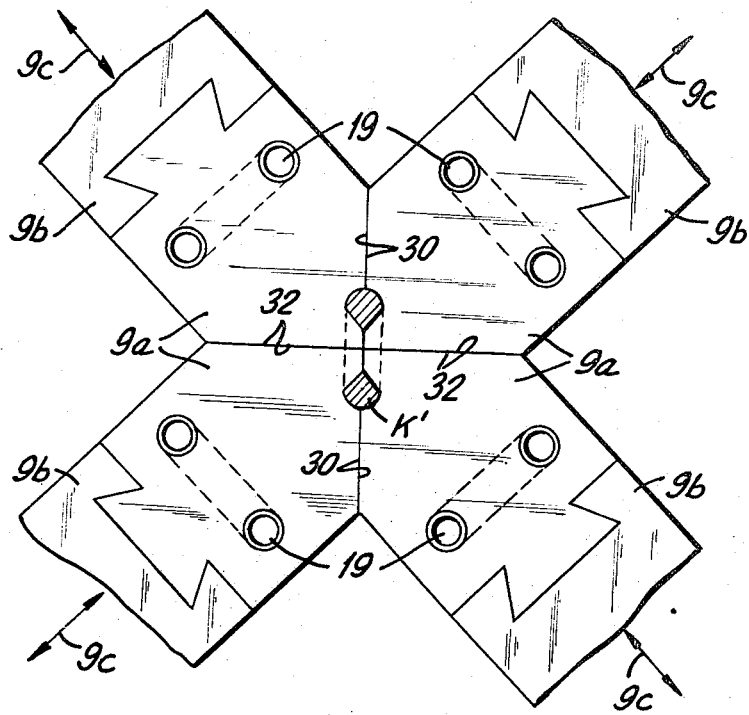
FIG. 2 is a partial section taken on the line 2—2 of FIG. 1.

In accordance with a further feature of the invention, an injection tool or a displaceable mold block assembly generally designated 9 is arranged directly below the nozzle 5. The mold block assembly 9 includes, as best indicated in FIG. 2, four-jaw-like exchangeable pieces or mold elements 9a which are held in a chuck member 9b having a comparable number of displaceable arm elements which engage each of the molds 9a in dove-tail engagement. The arm elements of the chuck member 9b are arranged for movement in radial inward and outward direction, as indicated by the arrows 9c, by means (not shown).

Figure 5:
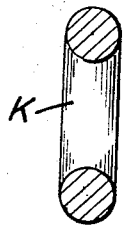
FIG. 5 is a section of a chain link which may be made with the machine of the invention.
Figure 6:
FIG. 6 is a cross section similar to FIG. 5 of another embodiment of the chain link.

As indicated in FIGS. 1, 5 and 6, the chain links K which are to be injection-molded have a simple oblong form of a circular cross section of the type indicated in FIG. 5, or the cross section of the type indicated K' in FIG. 6.

Figure 4:
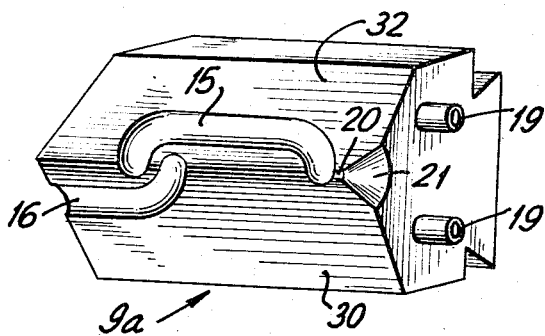
FIG. 4 is a perspective view of one of the mold elements turned on its side.

The mold elements 9a each have oblique end faces 30 and 32 (FIGS. 2 and 4) permitting them to be brought together in the manner indicated in FIG. 2. Each mold element advantageously includes heat conduits or pipes 19 which extend therethrough and which are provided for supplying a heating fluid or a cooling fluid in accordance with requirements. Movement of the clamping element 9b to open the mold elements, that is to move them outwardly from the position indicated in FIG. 2, may be accomplished, for example, by hydraulic, pneumatic or a lever mechanism arrangement which may be manually operated, for example. The mold elements 9b are advantageously moved in an opening movement by an amount slightly more than the link thickness of the chain which is being molded. Since each of the mold elements is fitted to the chuck 9b by a simple dove-tail engagement they may be easily removed and exchanged for the purposes of varying the size of such elements and the configuration of the chain links which will be molded.

An essential feature of the invention is that each of the mold elements includes a molding cavity 15 for forming a chain link and a chain holding cavity 16 for positioning a link so that a new link may be molded therearound. In the embodiment illustrated, the molding elements 9a are arranged so that an upper level or floor is provided with the cavities 15 forming, when the mold elements 9a are closed, a complete chain link cavity accessible for injection molding places through a conical bore 21 at the top. In addition, it includes a lower floor in which the cavities 16 form, when the molding elements 9a are brought together, a space for accommodating the upper portion of a link which has been molded during the previous operation. The upper portion of the previously formed link is held in a position so that a new link will be molded therearound. Injection is downwardly from the nozzle 5 through the conical slot or bore 21 and into the mold cavity 15. As indicated, when injection-molding takes place, a new link will be formed in a cavity 15 and will extend around a previously formed link K, the upper end of which is positioned in the holding cavity 16.

In FIG. 1 the parts are indicated with the injection piston starting its movement just prior to the downward movement of the injection nozzle 5. As indicated, nozzle bore 5a is already closed by the injection nozzle 5.

Figure 3:
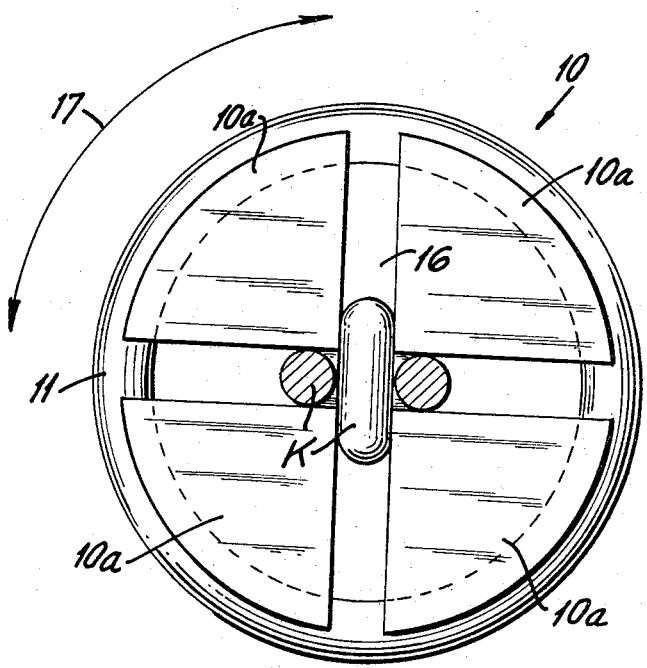
FIG. 3 is a section taken on the line 3—3 of FIG. 1.

Below the injection mold assembly 9 is arranged a clamping head generally designated 10 which, as best indicated in FIG. 3, includes four clamping jaw elements 10a which are biased inwardly by annular springs 11 and 11' to engage the finished links of the chain for positioning during the molding operation. All of the clamping elements 10a are held on a member (not shown) which may swing, during each cycle of operation, in the direction indicated by the arrow 17 to shift the jaw elements 10a about 90° in order to reorient the chain links thereby. The resilient elements 11 and 11' are such that the chain links K may be pulled downwardly through the clamping member 10 with jaw 10a exerting a slight braking action on the chain links. In the embodiment illustrated, a pair of sprocket wheels 12 and 12' is employed for engaging the chain links and pulling them downwardly through the clamping elements 10 at a controlled rate in accordance with the formation of each new link in the mold assembly 9.

As indicated in FIG. 1, the clamping heads 10 are located directly beneath the mold assembly 9 and hold the last link in the chain which has been formed in a position so that it extends upright and is located in the holding cavity 16 of the mold assembly 9. In the position indicated, a new link will be formed in the mold cavity 15 by the injection molding procedure and this new link will be formed so that it loops around the previously formed link K. Since the newly formed link is disposed at a plane of 90° from the link positioned in the holding cavity 16, the clamping head 10 must be rotated 90° in one direction and backwardly 90° for each succeeding cycle. After the injection cycle and upon opening of the mold elements 9a the chain is drawn downwardly about one link length, and after the newly formed link is engaged in the clamping member 10 the clamping assembly is turned about 90° to place the uppermost link in the cavity 16, which cavity forms the lower floor of the mold. After the mold elements 9a are brought together by movement of the chuck member 9b, an additional injection cycle is carried out to cause injection of the material through the nozzle 5, the bore 21 and slot 20 into the cavity 15.

If a suitable programming control of any kind is provided (for example pneumatically, hydraulically, or electrically adjustable by a time relay, mechanically or electronically), then during the production of the chain the following procedure takes place:

The injection procedure is initiated upon closing of the four-jaw mold elements 9a by uniform movement of the chuck 9b. The injection piston 2 dips into the injection cylinder 3 and the nozzle 5 moves downwardly and is automatically opened. A new chain link K is thus injection-molded in the upper floor in the mold cavity 15. Upon retraction of the piston 2, the nozzle 5 lifts off from the mold assembly 9 and the bore of the nozzle is closed by the needle 18 after the piston 2 raises the cross member 7 beyond the level of the abutments 8a.

Thereafter the mold 9 is opened by moving the mold elements radially outwardly in the directions indicated 9c and the advance rollers 12 draw the chain downwardly through the clamping head 10 for a distance of about one link. Thereupon the clamping head is turned about 90° and the jaws of the mold 9 are again closed. With the upper chain link positioned in the holding cavity 16, a new chain link is then formed by repeating the injection into the cavity 15.

At the end of the second injection cycle this procedure is repeated, but the clamping head 10 will be rotated backwardly about 90°. If it were otherwise, the chain would be twisted or the drawing-off device 12 would have to be arranged so that it could be rotated.

The working cycle thus extends in six steps:
(1) Closing of the four-jaw mold;
(2) Injection;
(3) Retraction of the nozzle into the starting position;
(4) Opening of the mold;
(5) Drawing-off of the chain about one link length; and
(6) Turning of the clamping head about 90°.

All of the operations are accomplished by means of a suitable programming (not shown). The finished chain may be wound on a reel or can be placed in a container.

The partitioning of the mold into the four-jaw elements requires for the production of a chain made of viscous materials, which can be worked only with difficulty, a chain profile that is not back tapered in respect to the movement direction of the jaws 9a (see FIG. 2). The chain links thus must have the cross section seen in FIG. 6. Otherwise it would be difficult to take the links out of the mold. However, if the material employed is soft and flows easily, then the chain profile may have the rounded cross section as seen in FIG. 5.

The invention, in respect to the details, particularly the construction of the injection cylinder 3, the clamping head 10 and the drawing-off device 12, can be adapted to the overall manufacturing operations and requirements. The method is not limited to symmetrical chain links of uniform cross section. In the event that complicated profiles are to be produced, the four-jaw mold may be fitted with slide members.

While specific embodiments of the invention have been shown and described in detail to illustrate the application of the inventive principles, it will be understood that the invention may be embodied otherwise without departing from such principles.

What is claimed is:
1. A device for molding chain links comprising a mold assembly, said mold assembly including four mold elements having oblique faces which may be moved together at a central concentric location for interengagement, the interengaged portions of said mold elements defining at a first level a mold cavity for forming a new endless chain link, said mold elements defining at a second level a cavity for holding a finishing chain link in the mold in a position so that the chain link will be looped about an end of said mold cavity whereby the newly formed chain link will be interengaged with the previously formed chain link, means at one end of said mold assembly defining an injection opening into said mold cavity for accommodating means for injecting material for molding thereinto, clamping means adjacent said holding cavity including four clamping elements adapted to engage the finished portion of the chain and to hold the uppermost chain in a position for engagement in said holding cavity, said mold elements being movable together to engage around a clamped chain link and for molding a new chain link therearound, and being separable to permit the drawing-off of the newly formed chain link into said clamping means in a position for engagement in the holding cavity, said clamping means being movable to move the newly formed chain link to a position to align it with said holding cavity when said molding elements are closed.

2. A device according to claim 1, including means for drawing said chain through said clamping means comprising a pair of sprocket elements.

3. A device according to claim 1, wherein said clamping elements include four quadrant members held centrally together by a resilient encircling band.

4. A device for molding chain links comprising a mold assembly made up of a plurality of individual movable mold elements, said mold elements being movable to an abutting position in which said elements define a molding chain link cavity at a first level and a holding chain link cavity at a second level for holding a finished chain link in a position in which it loops around the molding chain cavity, said molding elements being movable outwardly to permit release of the chain links therefrom after molding, clamping means disposed directly adjacent said mold for engaging said chain adjacent the link which is held by the holding cavity of the mold, including movable jaw elements for engaging the sides of each of said chain links and holding the chain links in an orientation at which they are position substantially 90° apart, and resilient means holding said jaw elements centrally.

5. A device for molding chain links comprising a mold assembly made up of a plurality of individual mold elements, said mold elements being movable to an abutting position in which said elements define a molding chain link cavity at a first level and a holding chain link cavity at a second level for holding a finished chain link in a position in which it loops around the molding chain cavity, said molding elements being movable outwardly to permit release of the chain links therefrom after molding, clamping means disposed directly adjacent said mold for engaging said chain adjacent the link which is held by the holding cavity of the mold, including movable jaw elements for engaging the sides of each of said chain links and holding the chain links in an orientation at which they are positioned substantially 90° apart, and resilient means holding said jaw elements centrally, said jaw elements being circular segments arranged concentrically about the chain links and biased inwardly to hold the chain links in their right angular orientation.

6. A device for molding chain links comprising a mold assembly made up of a plurality of individual movable mold elements, said mold elements being movable to an abutting position in which said elements define a molding chain link cavity at a first level and a holding chain link cavity at a second level for holding a finished chain link in a position in which it loops around the molding chain cavity, said molding elements being movable outwardly to permit release of the chain links therefrom after molding, clamping means disposed directly adjacent said mold for engaging said chain adjacent the link which is held by the holding cavity of the mold, including movable jaw elements for engaging the sides of each of said chain links and holding the chain links in an orientation at which they are positioned substantially 90° apart, resilient means holding said jaw elements centrally, said jaw elements beeing circular segments arranged concentrically about the chain links and biased inwardly to hold the chain links in their right angular orientation, and means for drawing the chain links through said clamping means.

7. A device for molding chain links comprising a mold assembly made up of a plurality of individual movable mold elements, said mold elements being movable to an abutting position in which said elements define a molding chain link cavity at a first level and a holding chain link cavity at a second level for holding a finished chain link in a position in which it loops around the molding chain cavity, said molding elements being movable outwardly to permit release of the chain links therefrom after molding, clamping means disposed directly adjacent said mold for engaging said chain adjacent the link which is held by the holding cavity of the mold, including movable jaw elements for engaging the sides of each of said chain links and holding the chain links in an orientation at which they are positioned substantially 90° apart, resilient means holding said jaw elements centrally, said jaw elements beeing circular segments arranged concentrically about the chain links and biased inwardly to hold the chain links in their right angular orientation, and means for drawing the chain links through said clamping means, including a pair of sprocket wheels engageable with the chain links.

References Cited

UNITED STATES PATENTS

| 923,521 | 6/1909 | Herron | 249—57 |
| 2,498,031 | 2/1950 | Deiss | 18—42 X |
| 2,657,429 | 11/1953 | Faust | 18—42 X |
| 2,829,402 | 4/1958 | Morin | 264—242 |
| 3,176,357 | 4/1965 | Nelson | 249—57 |
| 3,187,072 | 6/1965 | Morin | 264—242 |

J. SPENCER OVERHOLSER, *Primary Examiner.*

W. L. McBAY, *Assistant Examiner.*